US005559703A

United States Patent [19]
Iwata et al.

[11] Patent Number: 5,559,703
[45] Date of Patent: Sep. 24, 1996

[54] FUEL CUT AND IGNITION TIMING CONTROL SYSTEM FOR CONTROLLING ACCELERATION SLIP

[75] Inventors: Toru Iwata; Sota Yasuda, both of Yokohama, Japan

[73] Assignee: Nissan Motor Co., Ltd., Yokohama, Japan

[21] Appl. No.: 353,248

[22] Filed: Dec. 2, 1994

[30] Foreign Application Priority Data

Dec. 14, 1993 [JP] Japan .................................. 5-313537

[51] Int. Cl.⁶ .................................................. B60K 28/16
[52] U.S. Cl. ................... 364/426.03; 180/197; 123/333; 123/481
[58] Field of Search ........................ 364/426.02, 426.03; 180/197; 123/333, 481, 493

[56] References Cited

U.S. PATENT DOCUMENTS

| | | | |
|---|---|---|---|
| 4,959,794 | 9/1990 | Shiraishi et al. | 180/197 |
| 5,038,883 | 8/1991 | Kushi | 180/197 |
| 5,067,579 | 11/1991 | Kushi et al. | 180/197 |
| 5,099,942 | 3/1992 | Kushi et al. | 180/197 |
| 5,213,178 | 5/1993 | Polidan et al. | 364/426.03 |
| 5,238,081 | 8/1993 | Maeda et al. | 364/426.03 |
| 5,282,137 | 1/1994 | Suzuki et al. | 364/426.03 |
| 5,283,742 | 2/1994 | Wazaki et al. | 180/197 |
| 5,287,279 | 2/1994 | Anan | 364/426.03 |
| 5,291,965 | 3/1994 | Takata | 180/197 |
| 5,335,744 | 8/1994 | Takasuka et al. | 364/426.03 |

FOREIGN PATENT DOCUMENTS 63-309745  12/1988  Japan .
1-147127   6/1989   Japan .

Primary Examiner—Gary Chin
Attorney, Agent, or Firm—Lowe, Price, LeBlanc & Becker

[57] ABSTRACT

A control system for controlling an acceleration slip of a wheeled vehicle by performing a fuel cut control and an ignition timing control is designed to prevent a temperature increase of an engine system and to prevent a heating of a catalyst in an exhaust system when an engine output reduction control is continued. When a predetermined engine operating condition such as a high engine load condition or a high engine speed condition or a high engine temperature condition is detected during the engine torque reduction control, the control system further reduces the engine output gradually, or alternatively the control system inhibits the ignition timing control to reduce the engine output and instead increases the number of fuel cut cylinders.

22 Claims, 6 Drawing Sheets

FUEL CUT AND IGNITION TIMING CONTROL SYSTEM FOR CONTROLLING ACCELERATION SLIP

BACKGROUND OF THE INVENTION

The present invention relates to control system and method for controlling acceleration slip of a vehicle by performing fuel cut and ignition timing control.

Japanese Patent Provisional Publications No. S63(1988)-309745 and No. H1(1989)-147127 show acceleration slip control systems for controlling acceleration slip by manipulating a fuel cut system and an ignition timing system.

When a fuel cut and an ignition timing shift are performed simultaneously on the occurrence of acceleration slip, a combination of a delayed fuel injection in the fuel cut cylinders to which the fuel supply has been cut off and an ignition timing retard tends to cause an incompletely burned fuel residue which in turn causes after burning due to exothermic reaction in a catalytic converter of the exhaust system, and overheat of the catalyst. In order to prevent the after burning and the overheating of the catalyst, the acceleration slip control systems disclosed in these documents are arranged to inhibit a fuel enrichment (or an increase of fuel supply quantity) during an engine output reduction control. When, for example, the fuel supply to one cylinder is cut off in a six-cylinder engine, these conventional systems inhibit the fuel enrichment to the remaining five fueled cylinders.

SUMMARY OF THE INVENTION

The inhibition of the fuel enrichment to the remaining five fueled cylinders in the conventional systems, however, deprives the engine system of a cooling effect of lowering the temperature of the engine system (wall temperature and gas temperature) by the heat of vaporization of the fuel enrichment, and causes the engine system to suffer a temperature increase. This undesirable tendency is most severe when the number of fuel cut cylinders is one. This tendency increases as the number of fuel cut cylinders becomes smaller (as the number of fueled cylinders becomes greater). When the number of fuel cut cylinders is increased, the cooling effect by the fuel cut cylinders becomes more influential.

This problem is liable to arise specifically in a sporty driving operation on a high friction coefficient road in which the engine load is high, the possibility of the acceleration slip is high, and the engine output reduction control tends to continue for a long period of time.

It is therefore an object of the present invention to provide acceleration slip control system and method which can prevent a temperature increase of an engine system and overheating of a catalyst in an exhaust system during an engine output reduction control.

According to the present invention, an acceleration slip control system for a vehicle, comprises:

a fuel cut control system for controlling an acceleration slip by performing a fuel-cut;

an ignition timing control system for controlling the acceleration slip by varying an ignition timing;

a calculating means for calculating a drive wheel slip quantity;

a judging means for judging whether the drive wheel slip quantity is greater than a predetermined threshold;

a discriminating means for discriminating an acceleration slip control inhibition region in accordance with an engine operating condition; and a controlling means.

The controlling means is a means for reducing an engine output gradually or stepwise when the drive wheel slip is greater than the threshold, and the engine operating condition is in the inhibition region; or a means for inhibiting an ignition timing variation of an engine output reduction control and increasing a number of fuel cut cylinders to which fuel supply is to be cut off when the drive wheel slip is greater than the threshold, and the engine operating condition is in the inhibition region.

Thus, the control system sets the predetermined engine operating region, and prevents the temperature of the engine system from becoming higher and the catalytic converter from being heated, by inhibiting a continuous normal engine reduction control in this predetermined engine operating region.

DETAILED DESCRIPTION OF THE INVENTION

Figure 1:
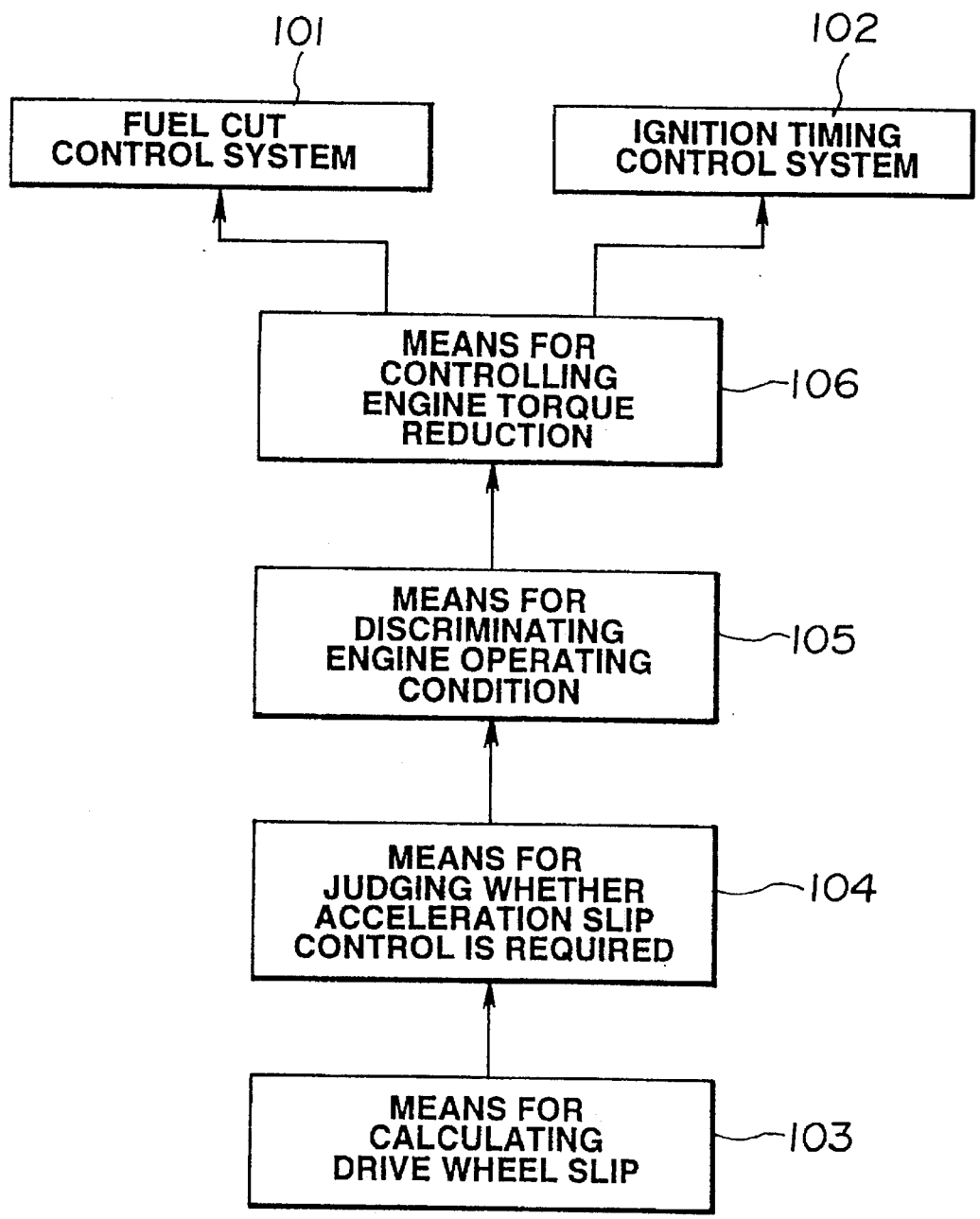
FIG. 1 is a block diagram showing various means which can be employed in the present invention.

FIG. 1 schematically shows an example of a control system according to the present invention. In the example shown in FIG. 1, the control system includes at least a fuel cut control system 101 for controlling an acceleration slip by performing a fuel-cut; an ignition timing control system 102 for controlling the acceleration slip by varying an ignition timing; a calculating means 103 for calculating a drive wheel slip quantity; a judging means 104 for judging whether the drive wheel slip quantity is greater than a predetermined threshold; a discriminating means 105 for discriminating an acceleration slip control inhibition region in accordance with an engine operating condition; and a controlling means 166 for controlling the fuel cut system 101 and the ignition timing control system 102. The judging means 104 may be a means for judging whether the acceleration slip quantity is equal to or greater than the threshold, and whether an acceleration slip control for reducing an engine output torque by performing the fuel cut and the ignition timing shift is being performed or requested.

The controlling means 106 may be a means for reducing an engine output gradually when the drive wheel slip is greater than the threshold, and the engine operating condition is in the inhibition region. When the acceleration slip control inhibition region is detected during a time in which the acceleration slip control is being performed or requested, the controlling means 106 can gradually or stepwise increase an amount of reduction of the engine output torque beyond an amount of engine torque reduction being performed or requested until the engine operating condition goes out of the inhibition region. During the period during which the engine output torque reduction control combining the fuel cut and the ignition timing shift are being continued, this controlling means 106 can forcibly reduce the engine output to expedite a recovery from the inhibition region, and to terminate the acceleration slip control. Therefore, this control system can prevent the temperature of the engine from becoming high, and prevent a catalytic converter from being heated. The engine output reduction is increased gradually or stepwise so that this control system does not cause a driver and passengers to have an unnatural feeling such as a feeling of engine braking. This control system need not inhibit the fuel enrichment to the fueled cylinders to which the fuel supply is not cut off. Therefore, this control system can utilize the cooling effect due to the heat of fuel vaporization, too.

The controlling means 106 may be a means for inhibiting an ignition timing variation of an engine output reduction control and increasing a number of fuel cut cylinders to which fuel supply is to be cut off when the drive wheel slip is greater than the threshold, and the engine operating condition is in the inhibition region. When the acceleration slip control inhibition region is detected during a time in which the acceleration slip is being performed or requested, this controlling means 106 inhibits the ignition timing shift of the engine output reduction control being performed or requested, and increases the number of fuel cut cylinders. During the period during which the engine output torque reduction control combining the fuel cut and the ignition timing shift are being continued, this control system can prevent the engine temperature from becoming higher by increasing the number of fuel cut cylinders, and prevent the catalyst in the exhaust system from being heated by a long s continuation of the engine operation in the acceleration slip inhibition region, by inhibiting the ignition timing variation which is causative of the heating of the catalyst. By increasing the number of fuel cut cylinders instead of the ignition timing shift, this control system can increase the amount of the engine output reduction. Therefore, this control system can prevent a temperature increase of the engine system and an overheating of the catalyst by facilitating an escape from the inhibition region and causing the acceleration slip control to terminate sooner.

Figure 2:
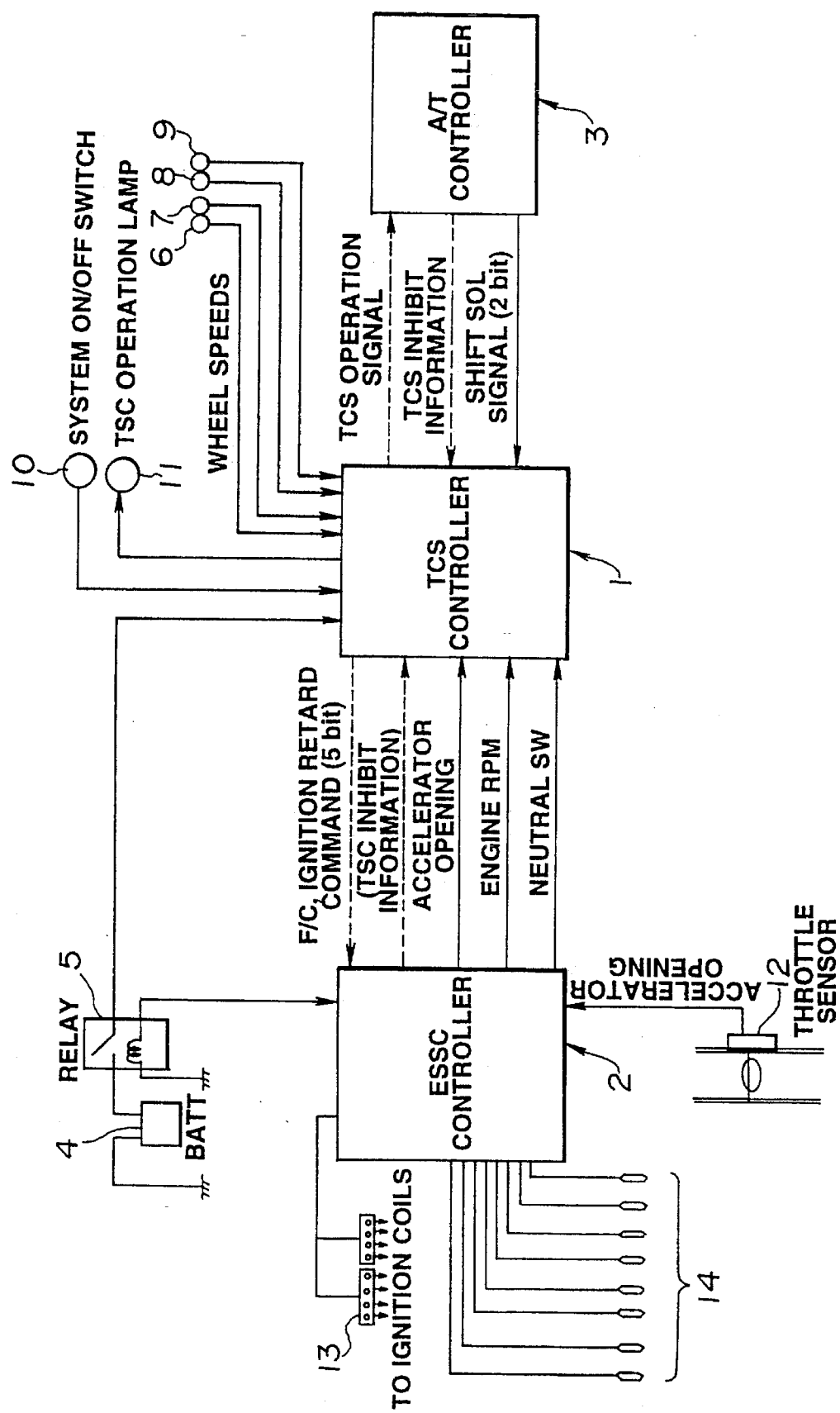
FIG. 2 is a schematic view showing an acceleration slip control system for a rear wheel drive vehicle according to a first embodiment of the present invention.

FIG. 2 shows an acceleration slip control system according to a first embodiment of the present invention. A vehicle of this embodiment is equipped with a fuel cut control system for restraining acceleration slip by the fuel cut, and an ignition timing control system for restraining the acceleration slip by varying the ignition timing of an engine of the vehicle.

The control system shown in FIG. 2 has a controller which, in this example, includes a TCS controller 1, an ECCS controller 2 and an A/T controller 3. The TCS controller 1 and the ECCS controllers 2 are connected with a battery 4 through a relay 5.

The TCS controller 1 is an electronic control circuit which receives various input information items, performs a control procedure for controlling the acceleration slip of the drive wheels of the vehicle by fuel cut and ignition retard, and produces control command signals.

Four wheel speed sensors 6, 7, 8 and 9 sense the wheel speeds of all the four wheels of the vehicle, respectively, and deliver sensor signals to the TCS controller 1. The TCS controller 1 further receives a switch signal from a system on-off switch 10. The TCS controller 1 delivers a lamp-on signal to a TCS operation lamp 11.

The ECCS controller 2 is an electronic control circuit which normally performs a fuel injection control procedure in accordance with an accelerator opening degree (or throttle opening degree). When the TCS controller 1 is commanding a TCS control, the ECCS controller 2 performs a fuel cut control in response to a fuel cut command signal, and performs an ignition spark retard control in response to a spark retard command signal.

A throttle sensor 12 senses the accelerator opening degree (or throttle opening degree) and delivers a sensor signal to the ECCS controller 2. In this example, the throttle sensor 12 serves as an accelerator sensor for sensing a condition of an accelerator system. The ECCS controller 2 delivers an ignition timing control signal to a power transistor unit 13 for controlling ignition coils, and a fuel injection control signal to each of fuel injectors 14. In this example, the power transistor unit 13 is composed of two power transistor units.

The three controllers 1, 2 and 3 exchange information items among them. The ECCS controller 2 sends information about TCS inhibition, the accelerator opening, the engine speed (or engine rpm), and a neutral switch, to the TCS controller 1. Sent from the TCS controller 1 to the ECCS controller 2 are the fuel cut command signal and the ignition retard command signal. The A/T controller 3 gives the TCS controller 1 information about TCS inhibition and a shift solenoid signal. The TCS controller 1 supplies a TCS operation signal to the A/T controller 3.

Figure 3:
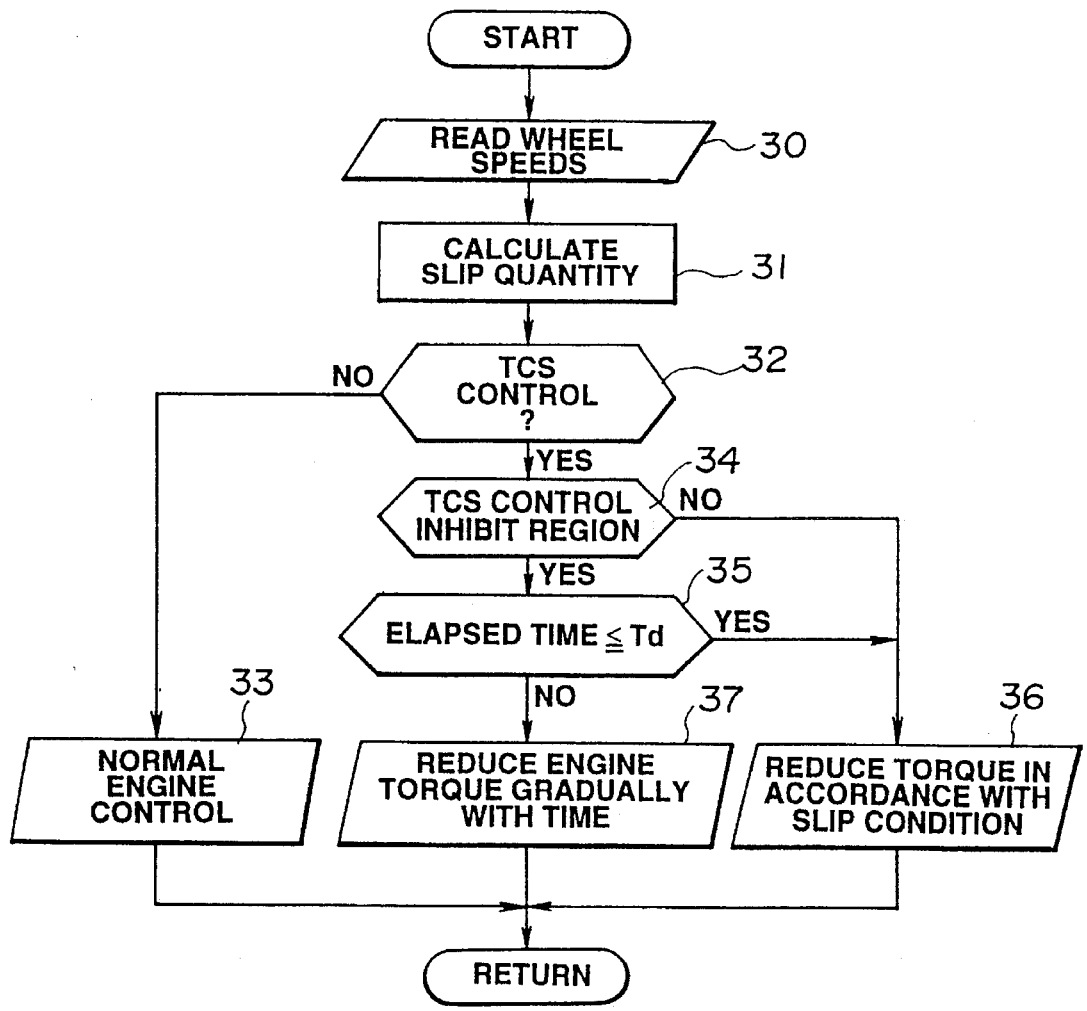
FIG. 3 is a flow chart showing a control procedure performed by a TCS controller of the control system according to the first embodiment.

FIG. 3 shows an acceleration slip control procedure performed by the TCS controller 1 of the first embodiment.

At a step 30, the TCS controller 1 reads the left and right front wheel speeds and the left and right rear wheel speeds sensed by the four wheel speed sensors 6, 7, 8 and 9.

At a step 31, the TCS controller 1 determines a drive wheel slip (or drive wheel slip quantity) for TCS control. In this example, the drive wheel slip is a difference between a drive wheel speed and a non-drive wheel speed. In the case of a FR vehicle in which the rear wheels are drivingly connected with the engine and the front wheels are not connected with the engine, the drive wheel slip is a difference resulting from subtraction of the average of the left and right front wheel speeds from the average of the left and right rear wheel speeds, for example.

At a step 32, the TCS controller 1 determines whether or not the drive wheel slip is greater than a predetermined threshold and the TCS control by the fuel cut and ignition retard is being performed or requested. From the step 32, the TCS controller 1 proceeds to a step 33 if the TCS control is not being performed or requested, and to a step 34 if the TCS control is being performed or requested.

At the step 33, the, TCS controller 1 causes the ECCS controller 2 to perform the normal engine control. Therefore, the ECCS controller 2 performs a normal fuel injection control and a normal ignition timing control.

When the answer of the step 32 is affirmative, then the TCS controller 1 proceeds from the step 32 to the step 34.

At the step 34, the TCS controller 1 determines whether the engine operating condition is in a predetermined TCS control inhibition region. The TCS control inhibition region is determined by at least one of the following conditions.

(i) The engine speed (rpm) Ne is equal to or higher than a predetermined speed ωE0 (=3500 rpm, for example).

Figure 4:
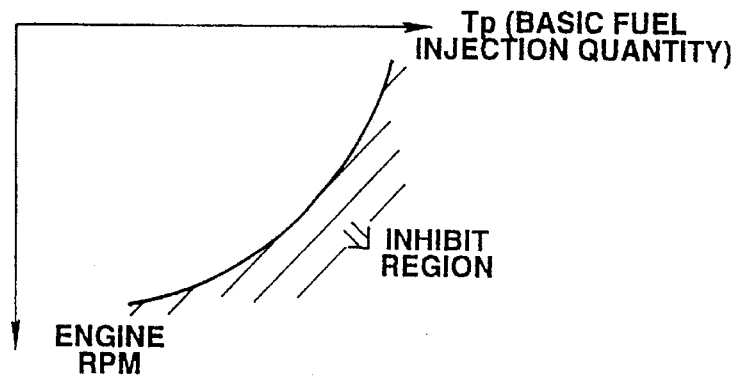
FIG. 4 is a view of a map showing one example of a control inhibition region which can be employed in the control system according to the first embodiment.

(ii) A product obtained by multiplying a basic fuel injection quantity Tp by the engine speed Ne is greater than a predetermined constant value, as shown in a two dimensional map of FIG. 4. In FIG. 4, a shaded region where Tp×Ne is greater than the predetermined value corresponds to an high engine load region.

(iii) An intake (manifold) negative pressure (or an intake air flow rate) is equal to or greater than a predetermined constant value.

It is possible to determine the basic fuel injection quantity Tp, for example, by multiplying a fraction whose numerator is the intake air flow rate Qa and whose denominator is the engine speed Ne, by a predetermined constant K as in a conventional example of the fuel injection control. In this case, Tp=K×(Qa/Ne).

If the engine operating condition is in the TCS control inhibition region, then the TCS controller 1 proceeds from the step 34 to a step 35. If it is not, the TCS 1 proceeds to a step 36.

At the step 35, the TCS controller 1 determines whether a time duration (or elapsed time) T during which the answer of the step 34 remains affirmative is equal to or smaller than a predetermined time length Td. The predetermined time length Td may be fixed (about 4 sec, for example), or may be such a function of the engine load that Td decreases as the engine load increases. From the step 35, the TCS controller 1 proceeds to the step 36 if T≦Td, and to a step 37 if T>Td.

The step 36 is reached when it is judged at the step 34 that the engine operating condition is out of the TCS control inhibition region, or when it is judged at the step 35 that the time T which has elapsed from the instant at which the answer of the step 34 changes from negative to affirmative is smaller than Td. At the step 36, the TCS controller 1 commands the TCS control by the fuel cut and ignition timing retard in accordance with the slipping condition of the drive wheels.

The step 37 is reached when the engine operating condition is judged to be in the TCS control inhibition region, and the time T elapsed from the start of this judgment exceeds Td. At the step 37, the TCS controller 1 decreases the engine torque gradually with time by holding unchanged the number of fuel cut (unfueled) cylinder or cylinders to which the fuel supply is cut off, and instead by varying the spark advance (quantity) in the ignition timing retard until the engine operating condition moves out of the TCS control inhibition region.

Figure 5:
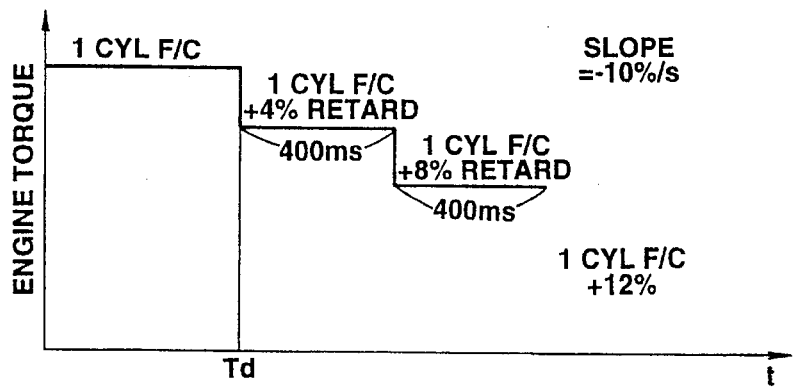
FIG. 5 is a graph showing one example of a torque reduction control characteristic which can be employed in the control system according to the first embodiment.

In an example shown in FIG. 5, the number of fuel cut cylinders is held equal to one invariably, and the ignition timing retard is increased by 4% every 40 msec so that a decreasing slope is set at −10%.

When the acceleration slip is greater than a predetermined threshold, the TCS control by the fuel cut and ignition retard is being performed or requested, and the engine operating condition is out of the TCS control inhibition region, then this traction control system carries out the TCS control by controlling the fuel cut and the ignition timing retard at the step 36.

When the engine operating condition is judged to be in the TCS control inhibition region while the acceleration slip control is being performed or requested, this control system first continues the normal TCS control until the predetermined time elapses. After the elapse of Td, the control system decreases the engine output further from the level of the engine output reduction currently being performed until an escape from the TCS control inhibition region.

Thus, the control system can prevent temperature increase in the engine system, and overheat of the catalyst in the exhaust system by forcibly reducing the engine output torque so as to cause a quick release from the TCS control inhibition region. In this case, the control system reduces the engine output so gradually that the driver and passenger do not have an uncomfortable feeling such as a feeling of engine braking.

This control system does not inhibit the fuel enrichment (or the increase of the fuel supply quantity) to the fueled cylinders to which the fuel supply is not cut off. Therefore, this control system can prevent the temperature increase of the engine more efficiently by utilizing the heat of vaporization of the fuel for cooling the engine.

The step 31 shown in FIG. 3 corresponds to the calculating means 103 shown in FIG. 1. The steps 32 and 34 correspond to the judging means 104 and the discriminating means 105, respectively. The step 37 corresponds to the controlling means 106.

Figure 6:
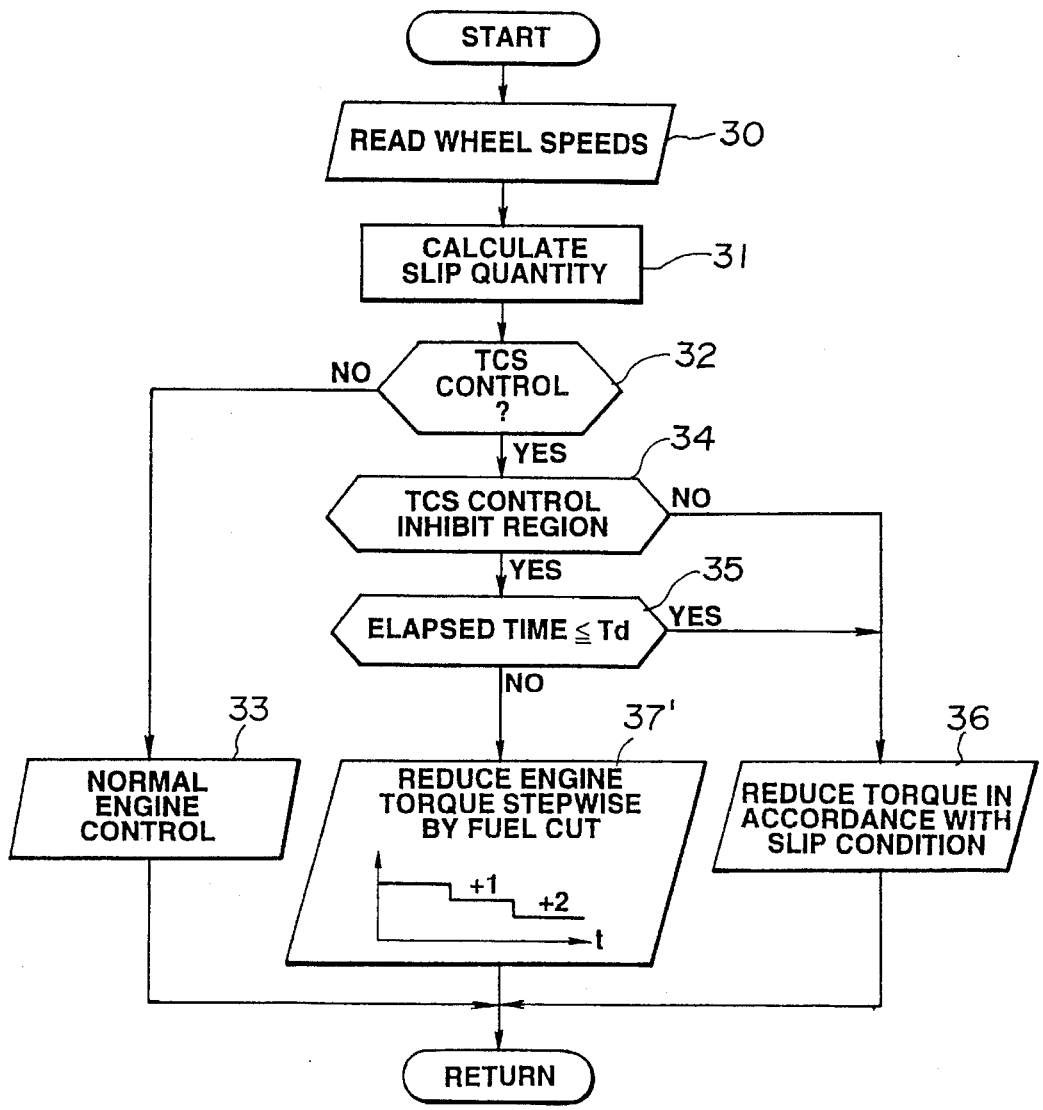
FIG. 6 is a flow chart showing a control procedure performed by a TCS controller of a control system according to a second embodiment of the present invention.

FIG. 6 shows an acceleration slip control procedure performed by a control system according to a second embodiment of the present invention. The control system of the second embodiment has a construction substantially identical to that of the first embodiment shown in FIG. 2. The control procedure shown in FIG. 6 is different from the procedure of FIG. 3 only in that a step 37' is substituted for the step 37. The other steps 30–36 are substantially the same between FIG. 3 and FIG. 6.

The step 37' in FIG. 6 is reached when the TCS controller 1 judges that the TCS control is being requested or being performed by request at the step 32, that the engine is in the TCS control inhibition region at the step 34, and that the predetermined time has elapsed since the start of the judgment that the engine is in the inhibition region. At the step 37', the TCS controller 1 of the second embodiment inhibits the ignition timing retard control, and instead increases the number of fuel cut (unfueled) cylinder or cylinders to which the fuel supply is to be cut off, one by one each time a predetermined time has elapsed. By so doing, the TCS controller 1 reduces the engine torque in a stepwise manner until the engine is forced out of the TCS control inhibition region.

In this way, the control system of the second embodiment can increase the cooling effect of the engine exhaust system due to the unfueled, non-combustion cylinder or cylinders by increasing the number of the unfueled cylinders; and can improve the effect of preventing the heating of the catalyst in the exhaust system by inhibiting the ignition timing retard control.

Figure 7:
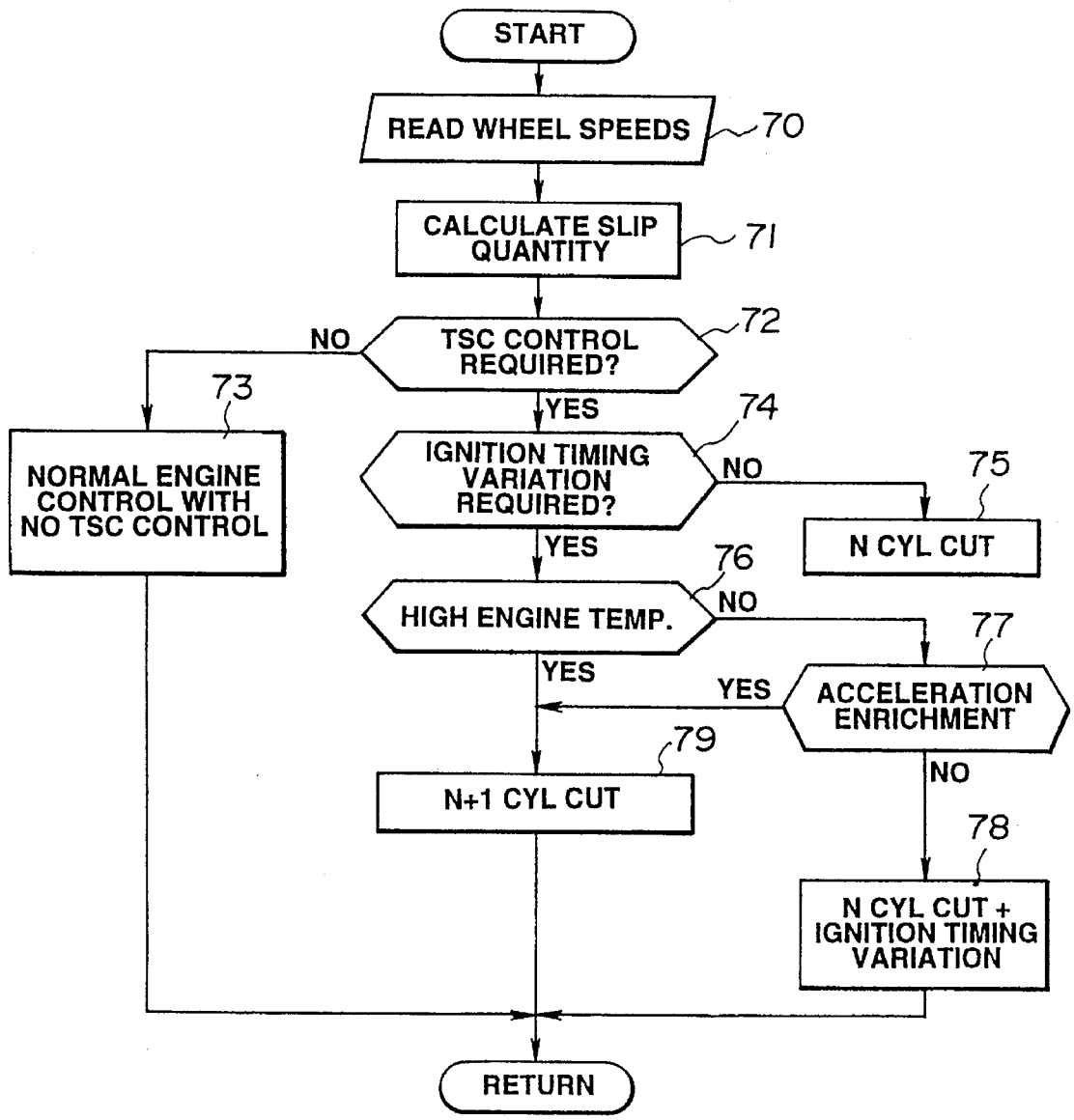
FIG. 7 is a flow chart showing a control procedure performed by a TCS controller of a control system according to a third embodiment of the present invention.

FIG. 7 shows a control procedure performed by a TCS controller 1 according to a third embodiment of the present invention. The control system of the third embodiment is constructed substantially in the same manner as shown in FIG. 2.

At a step 70, the TCS controller 1 reads the four wheel speeds sensed by the four wheel speed sensors 6, 7, 8 and 9.

At a step 71, the TCS controller 1 determines the drive wheel slip for TCS control by subtracting the non-drive wheel speed from the drive wheel speed. The step 71 corresponds to the calculating means 103 shown in FIG. 1.

At a step 72, the TCS controller 1 determines whether the drive wheel slip is greater than a predetermined threshold and the TCS control by the fuel cut and ignition retard is requested. From the step 72, the TCS controller 1 proceeds to a step 73 if the TCS control is not requested, and to a step 74 if the TCS control is requested. The step 72 corresponds to the judging means 104 shown in FIG. 1.

At the step 73, the TCS controller 1 commands the ECCS controller 2 to perform the normal engine control without performing the TCS control.

When the TCS control is requested, the number N of fuel cut (unfueled) cylinders to which the fuel supply is to be cut off is determined. The torque reduction attained by the fuel cut to one or more selected cylinders varies in dependence on the number of fuel cut cylinders. The number N is so determined that the torque reduction attained by the fuel cut of N cylinders is closest to a desired torque reduction.

At the step 74, the TCS controller 1 determines whether an ignition timing shift is requested or not.

The ignition timing shift request (signal) is any one of the following requests.

(i) A request by the traction control including TCS, 4WD (four wheel drive system) and LSD (limited slip differential).

(ii) A request by the engine control.

(iii) A request by an AT (automatic transmission) control.

When the ignition timing shift request is present, an amount of retard or advance for adjusting torque reduction is determined.

If the ignition timing control request is not present, the TCS controller 1 proceeds from the step 74 to a step 75. At the step 75, the control system performs the fuel cut to one or more cylinder in the number N.

If the ignition timing control request is present, the TCS controller 1 proceeds from the step 74 to a step 76. At the step 76, the TCS controller 1 determines whether the engine is in a high temperature state. The step 76 corresponds to the discriminating means 105.

This high temperature state is determined by at least one of the following conditions.

(i) The temperature of an engine coolant is equal to or higher than a predetermined temperature.

(ii) The output of an exhaust gas temperature sensor is equal to higher than a predetermined value.

(iii) A correction quantity for increasing the fuel injection quantity as the coolant temperature becomes higher is equal to or higher than a predetermined value.

If the engine is not in the high temperature state, the TCS controller 1 proceeds to a step 77. At the step 77, the TCS controller 1 determines whether an acceleration enrichment (fuel increase) is in effect. The step 77 corresponds to the discriminating means 105.

The acceleration enrichment is determined by at least one of the following conditions.

(i) A fuel injection quantity is equal to or greater than a predetermined value.

(ii) The basic fuel injection quantity determined by the engine speed and the intake air flow rate is equal to or greater than a predetermined value.

(iii) An air fuel ratio control correction quantity is equal to or greater than a predetermined value. The air fuel ratio control correction quantity in the fuel injection quantity is a correction quantity for increasing the fuel supply quantity as the engine load or engine speed increases.

(iv) A fuel enrichment quantity for increasing the fuel injection quantity when a change in the throttle opening degree or a change in the intake air amount is great, is equal to or greater than a predetermined value.

At a step 78 which is reached when the answers of the steps 76 and 77 are both negative (NO), this control system performs a normal TCS control by the fuel cut to N cylinders, and the ignition timing variation. In this case, the ignition timing variation may be an advance or may be a retard.

When the answer of the step 76 or 77 is affirmative, the TCS controller proceeds from the step 76 or 77 to a step 79. At the step 79, the control system performs the fuel cut to the cylinders in the number equal to N+1 without performing the ignition timing variation. The acceleration enrichment may be interrupted or may be continued. The step 79 corresponds to the controlling means 106 shown in FIG. 1.

Thus, the control system of the third embodiment performs the TCS control by the fuel cut to N cylinders plus the ignition timing variation in accordance with the slip condition of the drive wheels at the step 78. When, on the other hand, the engine is in the high temperature state or when the acceleration enrichment is being performed, the control system performs the TCS control by the fuel cut to N+1 cylinders without the ignition timing variation. During the period during which the engine output torque reduction control combining the fuel cut and the ignition timing shift are being continued, this controlling system can prevent the engine temperature from becoming higher by increasing the number of fuel cut cylinders, and prevent the catalyst in the exhaust system from being heated by a long continuation of the engine operating condition in the acceleration slip inhibition region, by inhibiting the ignition timing variation which is causative of the heating of the catalyst. By increasing the number of fuel cut cylinders instead of the ignition timing shift, this control system can increase the amount of the engine output reduction, and prevent a temperature increase of the engine system and an overheating of the catalyst by expediting an escape from the inhibition region and causing the acceleration slip control to terminate sooner.

Figure 8:
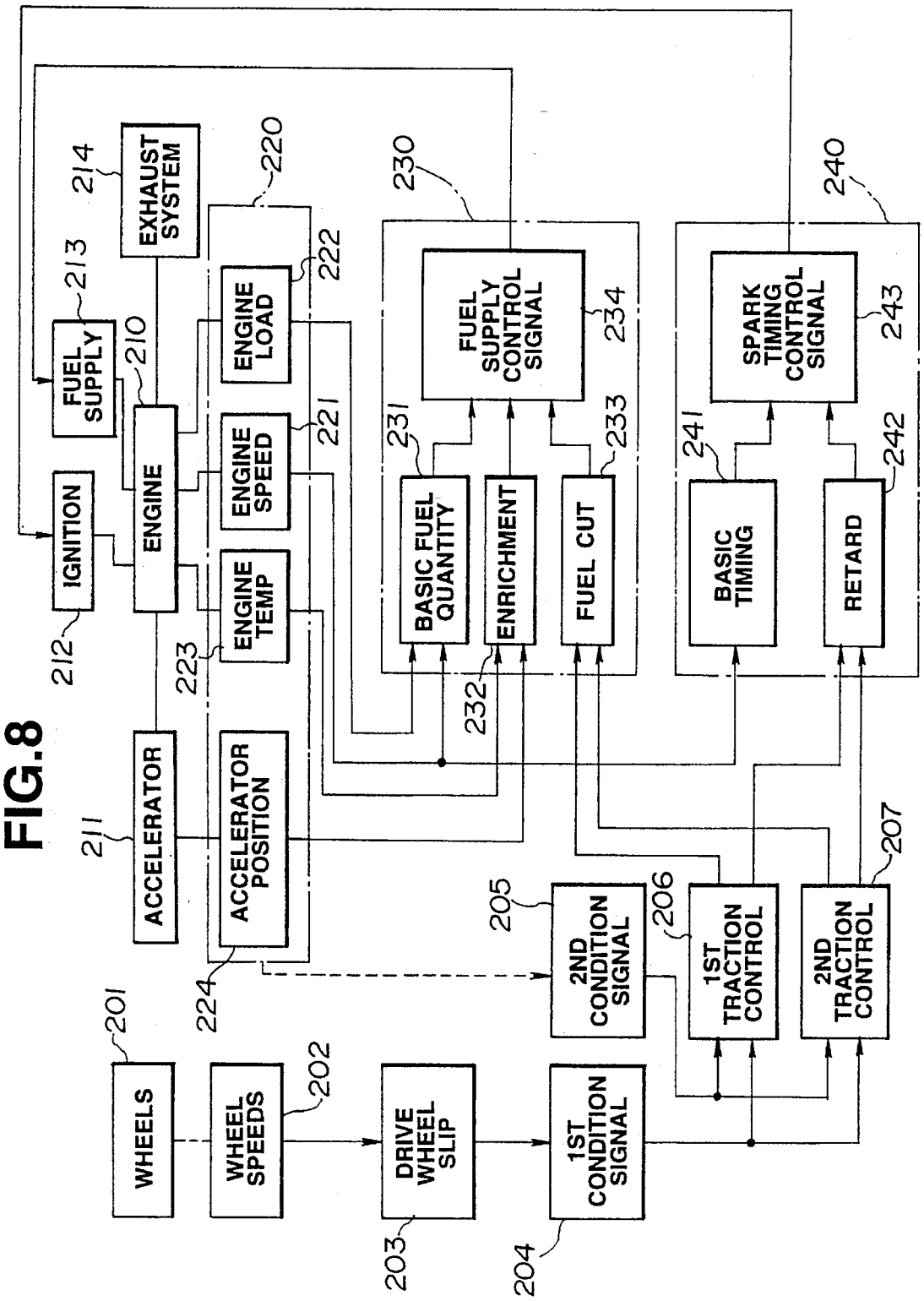
FIG. 8 is a block diagram schematically showing one example of a vehicle equipped with a control system according to the present invention.

FIG. 8 schematically shows one example of a vehicle to which the control system according to the present invention can be applied. The vehicle of this example has wheels 201, an internal combustion engine 210, an accelerator system 211 which, in this example, includes at least an accelerator pedal and a throttle valve, an ignition system 212, a fuel supply system 213, and an exhaust system 214 which, in this example, comprises a catalytic converter. The vehicle further has a sensor group which comprises wheel speed sensors 202 for sensing the wheel speeds of the wheels, and an engine operating parameter sensor 220 which, in this example, comprises at least one of an engine speed sensor 221 for sensing a first engine operating parameter indicative of an engine speed, an engine load sensor 222 for sensing a second engine operating parameter indicative of an engine load, an engine temperature sensor 223 for sensing a third engine operating parameter indicative of an engine temperature, and an accelerator sensor 224 for sensing a fourth engine operating parameter indicative of a condition of said accelerating system such as a throttle opening degree or an accelerator pedal depression degree.

The vehicle shown in FIG. 8 further includes a controller which, in this example, comprises an engine control unit corresponding to the ECCS controller 2 shown in FIG. 2, and a traction control unit corresponding to the TCS controller 1. Each control unit of this example has, as a main component, an onboard microcomputer. The engine control unit of this example comprises a fuel supply control section 230, and an ignition timing control section 240. The traction control unit of this example has a traction control section which comprises a first subsection (or calculating means) 203 for calculating or estimating a drive wheel slip condition such as a drive wheel slip quantity, a second subsection (or judging means) 204 for judging whether the drive wheel slip condition is greater than a predetermined threshold and for producing a first condition signal if it is, and a third subsection (or discriminating means) 205 for monitoring at least one sensor output signal from the parameter sensor 220 to determine whether a predetermined engine operating state exists and producing a second condition signal if it does. The traction control section of the example shown in FIG. 8 further comprises a first traction control subsection 206 for reducing an engine output torque in a first control mode when the first condition signal is present but the second condition signal is absent, and a second traction control subsection 207 for reducing the engine output torque in a second control mode when the first and second condition signals are both present. The first control subsection 206 performs a normal acceleration slip control by varying the first engine output torque reduction by the ignition timing variation and the second engine output torque reduction by the fuel cut in accordance with the drive wheel slip condition. The second control subsection 207 performs a special acceleration slip control by performing one of a first control for reducing the first engine output torque reduction of the ignition timing variation to zero or a smaller value and increasing the engine output reduction of the fuel cut, and a second control for increasing the first engine output is reduction by the ignition timing variation and/or the second engine output reduction by the fuel cut gradually or stepwise with time, and without regard to the slip condition as long as the first and second condition signals are present. The second control subsection 207 as well as the first subsection 206 can performs the acceleration slip control while allowing the fuel enrichment operation. The second control subsection 207 may include a means for increasing the number of fuel cut cylinders by one to an increased number of fuel cut cylinders, and holding an actual number of fuel cut cylinders constantly at the increased number as long as the first and second condition signals are present.

The fuel supply control section 230 of the example shown in FIG. 8 comprises a first subsection 231 for determining a basic fuel supply quantity such as the basic fuel injection quantity Tp, a second subsection 232 for determining one or more correction fuel quantities (or correction coefficients) such as an acceleration enrichment quantity (or an acceleration enrichment coefficient), an air fuel ratio control correction quantity (or coefficient), and a correction quantity (or coefficient) based on the engine temperature, a third subsection 233 for determining the number of selected fuel cut cylinders, and a fourth section 234 for receiving information items from the first, second and third subsections 231, 232 and 233 and producing a fuel supply control signal which may comprise signals to fuel injectors. The ignition timing control section 240 of the example shown in FIG. 8 comprises a first subsection 241 for determining a normal or basic ignition timing in accordance with an engine operating parameter such as the engine speed, a second subsection 242 for determining an ignition timing variation to reduce the engine output torque, and a third subsection 243 for producing an ignition timing control signal in accordance with data supplied from the first and second subsections 241 and 242. For example, the third subsection 243 determines the ignition timing represented by the ignition timing control signal by algebraically adding the normal igniting timing value determined by the first subsection 241 and the ignition timing variation determined by the second subsection 242.

According to the illustrated embodiments of the present invention, a control method for controlling an acceleration slip of a wheeled vehicle comprising an internal combustion multi-cylinder engine, comprises at least:

a first step of producing a first condition signal requesting an acceleration slip control when a predetermined drive wheel slip condition is detected;

a second step of producing a second condition signal when a predetermined engine operating condition is detected;

a third step of performing a normal acceleration slip control to reduce an engine output torque to reduce the acceleration slip by performing an ignition retard control and a fuel cut control for selectively cutting off fuel supply to the cylinders of the engine when said first condition signal is present and said second condition signal is absent; and a fourth step of reducing the engine output torque by performing one of a first engine torque reduction control operation (such as the operation in the step 79 or 37') for inhibiting said ignition timing retard control and for increasing said fuel cut control, and a second engine torque reduction control operation (such as the operation in the step 37 or 37') for further reducing the engine output torque gradually or stepwise. In the second engine torque reduction control operation, the ignition timing retard control may be increased gradually or stepwise, and the fuel cut control may be prevented from being increased.

What is claimed is:

1. An acceleration slip control system for a vehicle, comprising:

a fuel cut control system for controlling an acceleration slip by performing a fuel cut;

an ignition timing control system for controlling the acceleration slip by varying an ignition timing;

a calculating means for calculating a drive wheel slip quantity;

a judging means for judging whether the drive wheel slip quantity is greater than a predetermined threshold;

a discriminating means for discriminating an acceleration slip control inhibition region in accordance with an engine operating condition; and a controlling means for reducing an engine output in a first control mode in accordance with the drive wheel slip quantity by using said fuel cut control system and said ignition timing control system when the drive wheel slip quantity is greater than the predetermined threshold and the engine operating condition is out of the acceleration slip control inhibition region, and for further reducing the engine output gradually when the drive wheel slip quantity is greater than the predetermined threshold and the engine operating condition is in the inhibition region.

2. A control system according to claim 1 wherein:

said judging means includes a means for producing a first condition signal requesting an acceleration slip control when the drive wheel slip quantity is greater than the predetermined threshold, said discriminating means includes a means for producing a second condition signal for requesting a modification of the acceleration slip control when the engine operating condition is in the predetermined acceleration slip inhibition region, and said controlling means includes a means for reducing the engine output in the first control mode when the first condition signal is present and the second condition signal is absent, and further reducing the engine output gradually with time below a reduced level required in the first control mode without regard to the drive wheel slip quantity as long as the first and second condition signals are both present.

3. A control system according to claim 2 wherein said controlling means includes a means for reducing the engine output in a stepwise manner with time when said first and second condition signals are both present, and said discriminating means includes a means for producing said second condition signal when an engine operating parameter is equal to or higher than a predetermined level, said engine operating parameter being one of a first operating parameter indicative of an engine speed and a second operating parameter indicative of an engine load.

4. A control system according to claim 3 wherein said control system further comprises wheel speed sensors for sensing wheel speeds of front wheels and rear wheels of the vehicle, and an engine sensor which is one of an engine speed sensor and an intake air condition sensor for sensing one of an intake manifold pressure and an intake air flow rate of the engine, and said discriminating means includes a means for producing said second condition signal when said engine operating parameter continues to be equal to or higher than said predetermined level for a time longer than a predetermined time length.

5. An acceleration slip control system for a vehicle, comprising:

a fuel cut control system for controlling an acceleration slip by performing a fuel cut;

an ignition timing control system for controlling the acceleration slip by varying an ignition timing;

a calculating means for calculating a drive wheel slip quantity;

a judging means for judging whether the drive wheel slip quantity is greater than a predetermined threshold;

a discriminating means for discriminating an acceleration slip control inhibition region in accordance with an engine operating condition; and a controlling means for reducing an engine output gradually when the drive wheel slip is greater than the predetermined threshold and the engine operating condition is in the inhibition region;

wherein:

said judging means includes a means for producing a first condition signal requesting an acceleration slip control when the drive wheel slip quantity is greater than the predetermined threshold, said discriminating means includes a means for producing a second condition signal for requesting a modification of the acceleration slip control when the engine operating condition is in the predetermined acceleration slip inhibition region, and when an engine operating parameter is equal to or higher than a predetermined level, said engine operating parameter being one of a first operating parameter indicative of an engine speed and a second operating parameter indicative of an engine load, and said controlling means includes a means for reducing the engine output in a first control mode when the first condition signal is present and the second condition signal is absent, and further reducing the engine output gradually in a stepwise manner with time below a reduced level required in the first control mode when the first and second condition signals are both present;

wherein said controlling means comprises:

a first control means for producing an ignition timing control signal representing an ignition timing retard to reduce the engine output to reduce the drive wheel slip quantity in accordance with said ignition timing control system, and a fuel cut control signal representing a number of fuel cut cylinders to which the fuel supply is to be cut off by said fuel cut control system when the first condition signal is present and the second condition signal is absent; and a second control means for increasing the ignition timing retard at a constant rate of increase with respect to time to reduce the engine output and holding the number of fuel cut cylinders constant when the first and second condition signals are both present.

6. An acceleration slip control system for a vehicle comprising:

a fuel cut control system for controlling an acceleration slip by performing a fuel cut;

an ignition timing control system for controlling the acceleration slip by varying an ignition timing;

a calculating means for calculating a drive wheel slip quantity;

a judging means for judging whether the drive wheel slip quantity is greater than a predetermined threshold;

a discriminating means for discriminating an acceleration slip control inhibition region in accordance with an engine operating condition; and a controlling means for reducing an engine output gradually when the drive wheel slip is greater than the predetermined thresholdold and the engine operating condition is in the inhibition region;

wherein:

said judging means includes a means for producing a first condition signal requesting an acceleration slip control when the drive wheel slip quantity is greater than the predetermined threshold, said discriminating means includes a means for producing a second condition signal for requesting a modification of the acceleration slip control when the engine operating condition is in the predetermined acceleration slip inhibition region, and when an engine operating parameter is equal to or higher than a predetermined level, said engine operating parameter being one of a first operating parameter indicative of an engine speed and a second operating parameter indicative of an engine load, and said controlling means includes a means for reducing the engine output in a first control mode when the first condition signal is present and the second condition signal is absent, and further reducing the engine output gradually in a stepwise manner with time below a reduced level required in the first control mode when the first and second condition signal are both present;

wherein said controlling means comprises:

a first control means for producing an ignition timing control signal representing an ignition timing retard to reduce the engine output to reduce the drive wheel slip quantity in accordance with said ignition timing control system, and a fuel cut control signal representing a number of fuel cut cylinders to which the fuel supply is to be cut off by said fuel cut control system when the first condition signal is present and the second condition signal is absent; and a second control means for increasing the number of fuel cut cylinders one by one with time, and eliminating further variation of the ignition timing retard when the first and second condition signals are both present.

7. An acceleration slip control system for a vehicle, comprising:
   a fuel cut control system for controlling an acceleration slip by performing a fuel cut;
   an ignition timing control system for controlling the acceleration slip by varying an ignition timing;
   a calculating means for calculating a drive wheel slip quantity;
   a judging means for judging whether the drive wheel slip quantity is greater than a predetermined threshold;
   a discriminating means for discriminating an acceleration slip control inhibition region in accordance with an engine operating condition; and
   a controlling means for inhibiting an ignition timing control system from variation of ignition timing for reducing an engine output and increasing a number of fuel cut cylinders to which fuel supply is to be cut off when the drive wheel slip quantity is greater than the predetermined threshold and the engine operating condition is in the inhibition region;
   wherein said controlling means includes a means for reducing the engine output in a first control mode in accordance with the drive wheel slip quantity by using said fuel cut control system and said ignition timing control system when the drive wheel slip quantity is greater than the predetermined threshold and the engine operating condition is out of the inhibition region.

8. A control system according to claim 7 wherein:
   said judging means includes a means for producing a first condition signal requesting an acceleration slip control when the drive wheel slip quantity is greater than the predetermined threshold,
   said discriminating means includes a means for producing a second condition signal for requesting a modification of the acceleration slip control when the engine operating condition is in the acceleration slip control inhibition region, and
   said controlling means comprises:
      a first control means for reducing the engine output in the first control mode when the first condition signal is present and the second condition signal is absent, and
      a second control means for inhibiting the ignition timing control to reduce the engine output and increasing the number of fuel cut cylinders when the first and second condition signals are both present.

9. A control system according to claim 8 wherein said discriminating means includes a means for producing said second condition signal when one of first and second conditions is satisfied, said first condition being a condition which exists when an engine temperature is higher than a predetermined temperature, said second condition being a condition which exists when an acceleration enrichment control is in effect.

10. A control system according to claim 9 wherein said second control means includes a means for increasing the number of fuel cut cylinders by one.

11. A vehicle comprising:
   an internal combustion engine having a plurality of cylinders;
   wheels;
   an ignition system for varying an ignition timing of the engine in response to an ignition timing control signal;
   a fuel supply system for supplying fuel to all the cylinders of the engine in response to a fuel supply control signal when a number of selected fuel cut cylinders indicated by the fuel supply control signal is equal to zero, and cutting off fuel supply to at least one of the cylinders of the engine when the number of selected fuel cut cylinders is equal to or greater than one;
   wheel speed sensors for sensing wheel speeds of the wheels;
   a parameter sensor for sensing an engine operating parameter of the engine; and
   a controller for estimating a drive wheel slip condition from the wheel speeds sensed by the wheel speed sensors, for producing a first condition signal requesting an acceleration slip control when the drive wheel slip condition is greater than a predetermined threshold, for monitoring the engine operating parameter sensed by the parameter sensor to determine whether a predetermined engine operating state exists, for producing a second condition signal when said predetermined engine operating state exists; and for producing the ignition timing control signal and the fuel supply control signal in a first control mode for reducing an engine output torque by:
      varying the ignition timing by an ignition timing variation to reduce the engine output torque and
      increasing the number of selected fuel cut cylinders from zero when the first condition signal is present and the second condition signal is absent,
   and in a second control mode for reducing the engine output torque by implementing only one of:
      varying the ignition timing by the ignition timing variation and
      increasing the number of selected fuel cut cylinders, and by preventing the other of:
      varying the ignition timing variation and
      increasing the number of selected fuel cut cylinders from further reducing the engine output torque when the first and second condition signals are both present.

12. A vehicle according to claim 11 wherein said vehicle further comprises an accelerating system comprising an accelerator pedal and a throttle valve for the engine, said parameter sensor comprises an engine speed sensor for sensing a first engine operating parameter indicative of an engine speed, an engine load sensor for sensing a second engine operating parameter indicative of an engine load, an engine temperature sensor for sensing a third engine operating parameter indicative of an engine temperature and an accelerator sensor for sensing a fourth engine operating parameter indicative of a condition of said accelerating system, and said controller determines a fuel supply quantity represented by said fuel supply control signal in accordance with the first, second, third and forth engine operating parameters, and produces said second condition signal in accordance with at least one of said first, second, third and fourth engine operating parameters.

13. A vehicle according to claim 12 wherein said controller comprises an engine control section for performing an ignition timing traction control for reducing the engine output torque by varying a first manipulated variable representing the ignition timing variation, a fuel cut traction control for reducing the engine output torque by increasing a second manipulated variable representing the number of selected fuel cut cylinders, and a fuel enrichment control to increase the fuel supply quantity by increasing a third manipulated variable representing a fuel enrichment quantity in accordance with said engine operating parameters when said second condition signal is absent; and a traction control section which, when said first and second condition signals are both present, performs one of a first engine torque reduction control for inhibiting the ignition timing traction control and for increasing the fuel cut traction control, and a second engine torque reduction control for increasing the ignition timing traction control, for preventing the fuel cut traction control from being increased and for allowing the fuel enrichment control.

14. A vehicle according to claim 13 wherein said predetermined engine operating state is one of a high engine speed state which exists when the first parameter indicative of the engine speed remains equal to or higher than a predetermined threshold speed for a time equal to or longer than a predetermined time length, a high engine load state which exists when the second parameter indicative of the engine load remains equal to or higher than a predetermined threshold load for a time longer than a predetermined time length, a high engine temperature state in which the engine temperature is higher than a predetermined temperature, and an acceleration enrichment state in which the fuel supply quantity is increased to provide a smooth acceleration of the vehicle, and wherein said vehicle further comprises an exhaust system comprising a catalytic converter.

15. A vehicle according to claim 14 wherein said engine control section comprises an engine control microcomputer, and said traction control section comprises a traction control microcomputer for commanding said engine control microcomputer to gradually reduce the engine output torque by increasing a spark retard in a stepwise manner with time while holding the number of selected fuel cut cylinders constant when said first and second condition signals are both present.

16. A vehicle according to claim 14 wherein said engine control section comprises an engine control microcomputer, and said traction control section comprises a traction control microcomputer for commanding said engine control microcomputer to increase the number of selected fuel cut cylinder one by one gradually with time and for inhibiting the ignition timing traction control when said first and second condition signals are both present.

17. A vehicle according to claim 14 wherein said engine control section comprises an engine control microcomputer and said traction control section comprises a traction control microcomputer for inhibiting the ignition timing traction control of the engine control microcomputer and commanding the engine control microcomputer to increases the number of selected fuel cut cylinders to an increased number when the second condition signal appears, and holding the second manipulated variable equal to the increased number as long as said first and second condition signals are both present.

18. A vehicle according to claim 11, wherein said controller comprises:
an engine control section for performing an ignition timing traction control for reducing the engine output torque by varying a first manipulated variable representing the ignition timing variation,
a fuel cut traction control for reducing the engine output torque by increasing a second manipulated variable representing the number of selected fuel cut cylinders when said second condition signal is absent; and
a traction control section which, when said first and second condition signals are both present, performs one of:
a first engine torque reduction control for inhibiting the ignition timing traction control while increasing the fuel cut traction control, and
a second engine torque reduction control for preventing the fuel cut traction control from being increased while increasing the ignition timing traction control to further reduce the engine output torque.

19. A method for controlling an acceleration slip of a wheeled vehicle comprising an internal combustion multi-cylinder engine, the method comprising:
a first step of producing a first condition signal requesting an acceleration slip control when a predetermined drive wheel slip condition is detected;
a second step of producing a second condition signal when a predetermined engine operating condition is detected;
a third step of performing a normal acceleration slip control to reduce an engine output torque to reduce the acceleration slip by performing an ignition timing retard control for reducing the acceleration slip and a fuel cut control for selectively cutting off fuel supply to the cylinders of the engine when said first condition signal is present and said second condition signal is absent; and
a fourth step of reducing the engine output torque by performing one of:
a first engine torque reduction control for inhibiting said ignition timing retard control and for increasing said fuel cut control, and
a second engine torque reduction control for increasing one of:
the ignition timing retard control and
the fuel cut control
gradually with time to reduce the acceleration slip when said first and second condition signals are both present.

20. A method according to claim 19, wherein said fourth step comprises an operation for increasing the ignition timing retard control to reduce the engine output torque gradually with time and preventing increasing cut off of fuel supply to the cylinders by the fuel cut control when said first and second condition signals are both present.

21. A method according to claim 19, wherein said fourth step comprises an operation for inhibiting said ignition timing retard control and increasing said cut off of fuel supply to the cylinders in a stepwise manner with time when said first and second condition signals are both present.

22. A method according to claim 19, wherein said fourth step comprises an operation for inhibiting said ignition timing retard control and increasing said cut off of fuel supply to the cylinders with time when said first and second condition signals are both present.

* * * * *